US009199620B2

(12) United States Patent
Yoshizawa

(10) Patent No.: US 9,199,620 B2
(45) Date of Patent: Dec. 1, 2015

(54) VACUUM BOOSTER

(71) Applicant: NISSIN KOGYO CO., LTD., Ueda, Nagano (JP)

(72) Inventor: Takahiro Yoshizawa, Nagano (JP)

(73) Assignee: NISSAN KOGYO CO., LTD., Nagano (JP)

( * ) Notice: Subject to any disclaimer, the term of this patent is extended or adjusted under 35 U.S.C. 154(b) by 42 days.

(21) Appl. No.: 14/134,407

(22) Filed: Dec. 19, 2013

(65) Prior Publication Data

US 2014/0182987 A1 Jul. 3, 2014

(30) Foreign Application Priority Data

Dec. 27, 2012 (JP) .................................. 2012-284094

(51) Int. Cl.
*B60T 13/57* (2006.01)
(52) U.S. Cl.
CPC ...................................... *B60T 13/57* (2013.01)
(58) Field of Classification Search
CPC ..... B60T 13/57; B60T 13/575; B60T 13/569; B60T 13/72; B60T 13/563; B60T 13/565
USPC ....................................................... 303/114.3
See application file for complete search history.

(56) References Cited

U.S. PATENT DOCUMENTS

| | | | | |
|---|---|---|---|---|
| 4,164,168 A | * | 8/1979 | Tateoka | 91/376 R |
| 5,611,257 A | * | 3/1997 | Eick | 91/367 |
| 5,651,300 A | * | 7/1997 | Ikeda et al. | 91/376 R |
| 5,711,203 A | * | 1/1998 | Gautier et al. | 91/376 R |
| 6,089,140 A | * | 7/2000 | Kobayashi et al. | 91/369.1 |
| 6,976,417 B2 | * | 12/2005 | Leboisne et al. | 91/369.2 |
| 7,549,711 B2 | | 6/2009 | Yatabe | |
| 8,434,767 B2 | | 5/2013 | Takeshita et al. | |

FOREIGN PATENT DOCUMENTS

| | | | | |
|---|---|---|---|---|
| GB | 2230575 A | * | 10/1990 | ........... B60T 13/57 |
| JP | H-1111294 | | 1/1999 | |
| JP | 2913237 | | 6/1999 | |
| JP | 2004025911 | | 1/2004 | |
| JP | 2010139017 | | 6/2010 | |

OTHER PUBLICATIONS

Japanese Office Action for related JP application No. 2012-284094 drafted Nov. 21, 2014, 7 pages.

* cited by examiner

*Primary Examiner* — Xuan Lan Nguyen
(74) *Attorney, Agent, or Firm* — Andrew M. Calderon; Roberts Mlotkowski Safran & Cole, P.C.

(57) ABSTRACT

A vacuum booster is configured so that at least when an input rod is released, a front surface of a flexible portion of a valve element communicates with a first port which communicates with a vacuum chamber. A valve element holder is formed of a single member made of a sheet of steel which includes a rim portion, an annular arm portion, and a crimp holding portion. The rim portion is fitted to an inner circumferential surface of a valve cylinder via a seal member. The annular arm portion extends inwards in a radial direction from a front end of the rim portion. The crimp holding portion extends from an inner circumferential end of the arm portion to form a bag-like shape and to narrow a front opening portion thereof. The crimp holding portion crimp holds a mounting bead portion of the valve element from rear thereof.

20 Claims, 3 Drawing Sheets

VACUUM BOOSTER

CROSS REFERENCE TO RELATED APPLICATION

This application is based on and claims priority under 35 U.S.C. §119 to Japanese Patent Application No. 2012-284094 (filed on Dec. 27, 2012), the entire contents of which are incorporated herein by reference.

BACKGROUND

1. Field

The invention relates to a vacuum booster.

2. Related Art

For example, Japanese Patent No.2913237 describes a vacuum booster.

In the vacuum booster, a mounting bead portion of a valve element is held by a valve element holder so as to be in close contact with an inner circumferential surface of a valve cylinder.

When an input rod retracts, a vacuum pressure in a vacuum chamber acts on a front surface of a flexible portion that connects a valve portion of the valve element and the mounting bead portion and an atmospheric pressure in an atmospheric chamber acts on a rear surface of the flexible portion. Therefore, a pressing force resulting from a differential pressure between the pressure acting on the front surface and that acting on the rear surface of the flexible portion biases the valve portion forward, which requires an input return spring to have a set load which is enough to retract the input rod against the forward pressing force.

However, in the above described holding configuration of the valve element, the valve portion and the mounting bead portion of the valve element are spaced largely away from each other in a radial direction. Therefore, the flexible portion, which connects the valve portion with the mounting bead portion, has relatively wide pressure bearing areas of the front surface and the rear surface which bear the vacuum and the atmospheric pressure, respectively. Thereby, the forward pressing force resulting from the differential pressure to act on the flexible portion becomes large. Then, the load set on the input return spring has to be relatively large. However, in the event that a large load is set on the input return spring, this naturally increases the operation force of the input rod when the input rod is advanced, which is not preferable from the viewpoint of keeping a pedal operation feel good.

SUMMARY

The invention has been made in view of the above circumstances and provides a vacuum booster that can reduce a load set on an input return spring by making a pressing force resulting from a differential pressure acting on a flexible portion which connects a valve portion and a mounting bead portion of a valve element as small as possible to thereby keep a pedal operation feel good when an input rod is advanced.

According one aspect of the invention, a vacuum booster includes a booster shell, a booster piston, a valve cylinder, an input rod, a control valve, and an input return spring. The booster piston is accommodated in the booster shell to define an interior of the booster shell into a front vacuum chamber and a rear operation chamber. The front vacuum chamber is configured to be communicated with a vacuum source. The valve cylinder is connected to the booster piston. The input rod is provided in the valve cylinder. The control valve is provided in the valve cylinder. The control valve selectively causes the operation chamber to communicate with one of the vacuum chamber and atmosphere in accordance with back and forth movement of the input rod. The input return spring is provided between the valve cylinder and the input rod in a compression state. The input return spring biases the input rod in a retraction direction. The control valve includes a valve piston, an annular atmosphere introduction valve seat, an annular vacuum-pressure introduction valve seat, a valve element, and a valve spring. The valve piston is connected to a front end portion of the input rod and fitted to the valve cylinder so as to be slidable on the valve cylinder. The annular atmosphere introduction valve seat is provided on a rear end portion of the valve piston. The atmosphere introduction valve seat faces an atmospheric chamber in the valve cylinder. The annular vacuum-pressure introduction valve seat is provided in the valve cylinder so as to surround the atmosphere introduction valve seat. The valve element includes an annular valve portion, a mounting bead portion, and a flexible portion. The annular valve portion has a front surface that faces the vacuum-pressure introduction valve seat and the atmosphere introduction valve seat so that the front surface of the valve portion is able to sit thereon. The mounting bead portion is supported by the valve cylinder via a valve element holder at a rear of the valve portion. The flexible portion extends from a rear surface of the valve portion. The flexible portion is connected to the mounting bead portion so as to permit the back and forth movement of the valve portion. At least part of the flexible portion extends outwards in a radial direction of the valve cylinder. The valve spring is provided between the valve portion and the input rod in a compression state so as to bias the valve portion forward. A first port and a second port are provided in the valve cylinder. The first port establishes a communication between an outer circumferential portion of the vacuum-pressure instruction valve seat and the vacuum chamber. The second port establishes a communication between (i) the operation chamber and (ii) a part between the vacuum-pressure introduction valve seat and the atmosphere introduction valve seat. At least when the input rod is released, a front surface of the flexible portion communicates with the first portion. The valve element holder is formed of a single member made of a sheet of steel. The single member includes a rim portion, an annular arm portion, and a crimp holding portion. The rim portion is fitted to an inner circumferential surface of the valve cylinder via a seal member. The annular arm portion extends inwards in the radial direction from a front end of the rim portion. The crimp holding portion extends from an inner circumferential end of the arm portion to form a bag-like configuration and to narrow a front opening portion and that crimp-holds the mounting bead portion from the rear thereof.

With this configuration, when the input rod is in a released state, the vacuum pressure in the vacuum chamber is exerted on the front surface of the flexible portion of the valve element while the atmospheric pressure, which is introduced into the atmospheric chamber, is exerted on the rear surface of the flexible portion. This exerts a forward pressing force which results from a differential pressure between the vacuum pressure and the atmospheric pressure on the flexible portion. However, the mounting bead portion, which continues to the rear end of the flexible portion of the valve element, is crimp held by the crimp holding portion, which continues to the inner end of the arm portion which extends inwards in the radial direction from the rim portion which is fitted to the inner circumference of the valve cylinder. Thus, pressure bearing areas of the front and rear surfaces of the flexible portion where the vacuum and the atmospheric pressure are borne are reduced by an extent to which the mounting bead portion deviates inwards in the radial direction from the inner circumferential surface of the valve cylinder. Thereby, the forward pressing force which the flexible portion bears is reduced in turn. In association with this, the load set on the input return spring can also be reduced. Thereby, not only can the operation force with which the input rod is advanced be reduced, but also the brake pedal operation feel can be improved which is felt when the brake pedal is depressed to advance the input rod.

Moreover, the valve holder is formed of the single member made of the sheet of steel including the rim portion, the arm portion, and the crimp holding portion. Therefore, the increase in the number of constituent component can be suppressed, which contributes to the reduction in production costs.

Also, the seal member may be formed to have a ridge shape in section and be bonded to an outer circumferential surface of the rim portion through vulcanization.

With this configuration, the seal member is formed to have the ridge shape in section and is bonded to the outer circumferential surface of the rim portion through vulcanization. This enables the rim portion and the seal member to be integrated with each other. Thereby, not only can the increase in the number of constituent components be suppressed, but also the reduction in the number of man-hours involved in assemblage can be realized. Thus, the integration of the rim portion and the seal member contributes to reducing the production costs much further.

Also, an angle of a front slope of the seal member having the ridge shape in section may be smaller than an angle of a rear slope thereof.

With this configuration, the angle of the front slope of the seal member having the ridge shape in section is smaller than the angle of the rear slope thereof. Thereby, the rim portion can be inserted smoothly into the inner circumference of the valve cylinder. Thus, not only can the assemblage of the constituent components be improved, but also the separation of the seal member from the rim portion can be prevented which would otherwise be caused by resistance generated when the rim portion is inserted into the inner circumference of the valve cylinder.

The seal member may include a plurality of rows of ridge portions that are connected to each other at a trough portion.

With this configuration, the seal member includes the plurality of rows of ridge portions, which are connected to each other at the trough portion. Thus, the seal member contacts the inner circumferential surface of the valve cylinder at the plurality of seal portions. Thereby, not only can the sealing effect be enhanced, but also the vulcanized bonding surface between the seal member and the rim portion can be increased. As a result, it is possible to enhance the bonding strength between the seal member and the rim portion effectively.

Also, the mounting bead may include an annular projecting portion on an inner circumferential side thereof. A number of slits may be formed in an inner circumferential wall of the crimp holding portion. The slits may be opened on a front end of the inner circumferential wall. The inner circumferential wall may be bent so as to be brought into close contact with a front surface of the annular projecting portion.

With this configuration, the mounting bead portion includes the annular projecting portion on the inner circumferential side thereof. The number of slits are formed in the inner circumferential wall of the crimp holding portion. The slits are opened on the front end of the inner circumferential wall. The inner circumferential wall is bent so as to be brought into close contact with the front surface of the annular projecting portion. This facilitates the bending of the inner circumferential wall of the crimp holding portion. Thereby, the crimp holding of the mounting bead portion by the crimp holding portion can be facilitated in an ensured fashion.

Also, the rim portion may be formed into a step-like shape that includes an annular step portion in an intermediate portion of the rim portion. The annular step portion is directed forward. The step portion may include a surface facing rearward. The valve cylinder may include an annular shoulder portion that supports the annular step portion. The input return spring may be provided between the arm portion and the input rod in the compression state.

With this configuration, the rim portion is formed into the step-like shape, which includes the annular step portion in the intermediate portion of the rim portion. The step portion includes the surface facing rearward. The valve cylinder includes the annular shoulder portion, which supports the annular step portion. The input return spring is provided between the arm portion and the input rod in the compression state. This enables the input return spring to function not only to bias the input rod in the retraction direction but also to hold the valve holder in a predetermined position where the annular step portion is supported by the annular shoulder portion. Additionally, the arm portion of the valve holder serves as the spring seat portion which supports the front end of the input return spring. This obviates the necessity of providing a dedicated spring seat member, which contributes to realizing the simplified structure.

DETAILED DESCRIPTION

Exemplary embodiments of the invention will be described with reference to the accompanying drawings.

Figure 1:
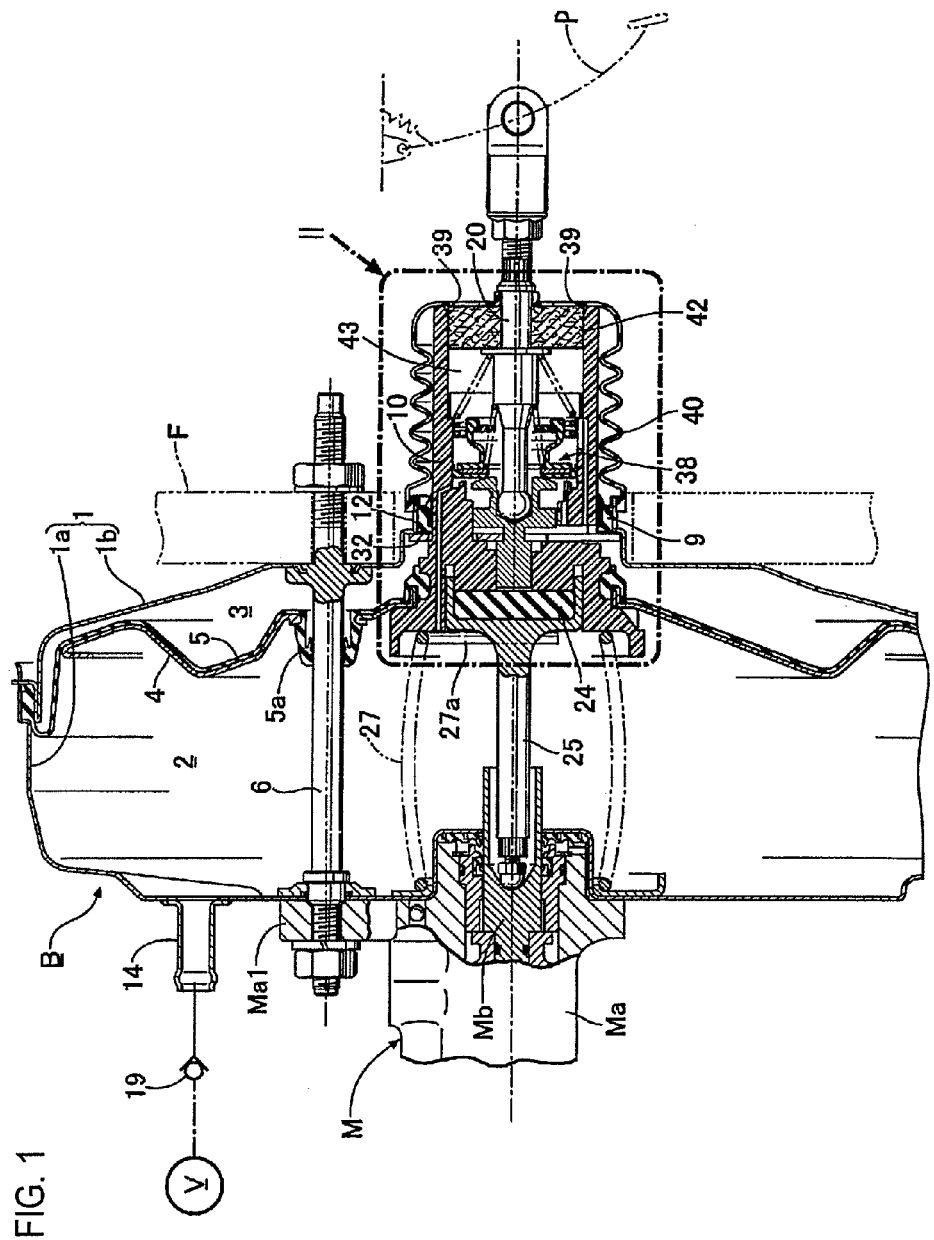
FIG. 1 is a vertical section view of a vacuum booster according one embodiment of the invention.
Figure 2:
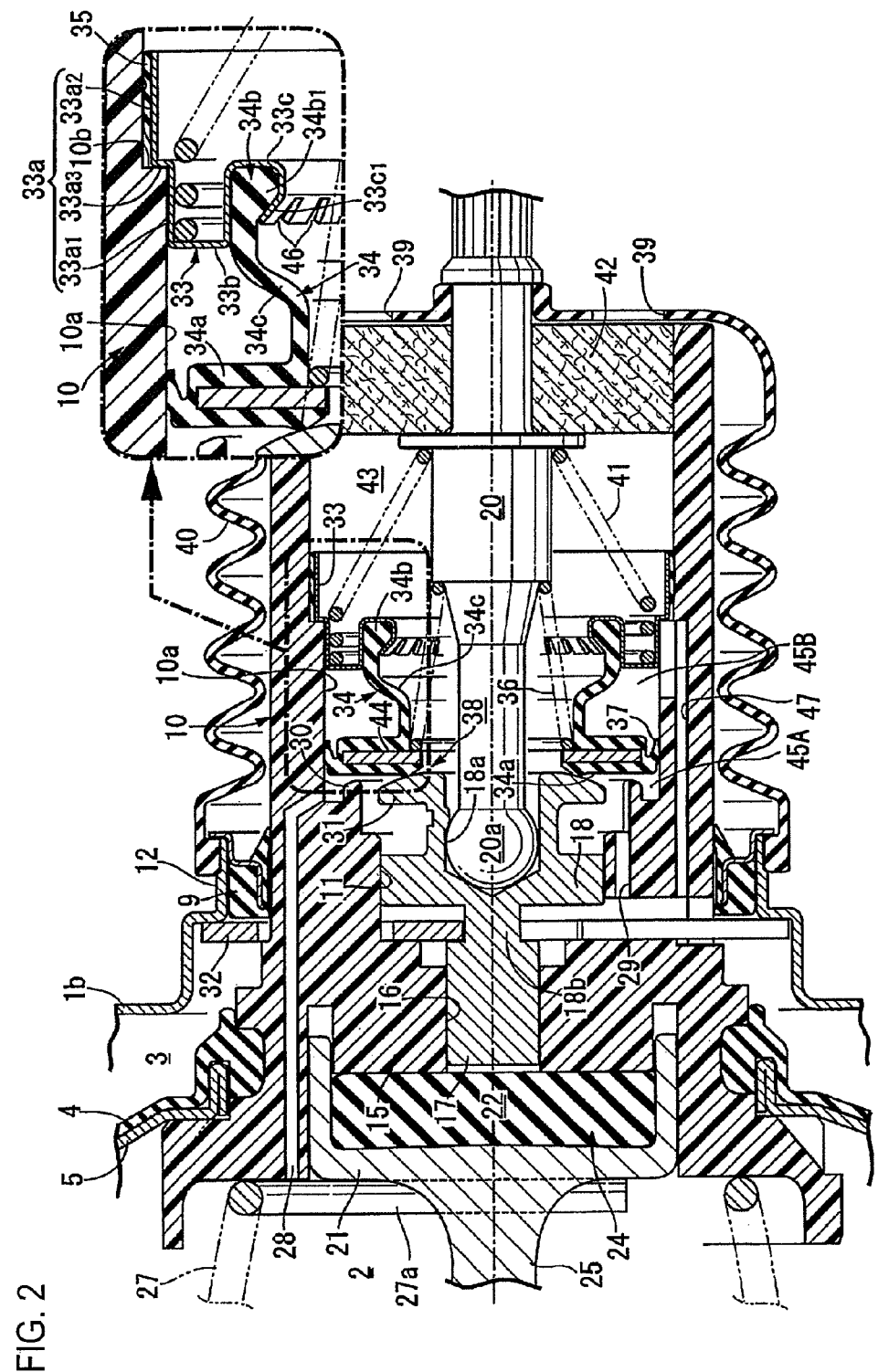
FIG. 2 is an enlarged view of a portion denoted by reference sign II in FIG. 1.

Firstly, in FIGS. 1 and 2, a booster shell 1 of a vacuum booster B includes a front shell half member 1a and a rear shell half member 1b which are each formed into a cup-like shape and which are coupled together at opposite ends thereof. These front shell half member 1a and rear shell half member 1b are each made of a sheet of steel and are coupled together via a pair of steel tie rods 6 (only one of which is shown in FIG. 1). The pair of tie rods 6 are disposed so as to be aligned across a central axis of the booster shell 1. Then, by making use of these tie rods 6, a mounting flange Ma1 of a cylinder body Ma of a master cylinder M is fastened to a front end face of the front shell half member 1a. Also, by making use of these tie rods 6, the rear shell half member 1b is fastened to a front surface of a vehicle body F.

An interior of the booster shell 1 is divided into a front vacuum chamber 2 and a rear operation chamber 3 by a booster piston 4 and a diaphragm 5. The booster piston 4 is accommodated in the booster shell 1 so as to be movable back and forth. The diaphragm 5 is superposed on a rear surface of the booster piston 4 and is held between the shell half members 1a, 1b. Cylindrical sliding seals 5a are formed integrally on the diaphragm 5. These sliding seals 5a penetrate an intermediate portion of the booster piston 4 in an airtight fashion and is slidable on the tie rods 6. The vacuum chamber 2 is connected with a vacuum source V (for example, an interior of an intake manifold of an internal combustion engine) via a vacuum pressure inlet pipe 14 and a check valve 19.

A resin valve cylinder 10 is integrally coupled to central portions of the booster piston 4 and the diaphragm 5. A bearing cylinder 12 supports the valve cylinder 10 via a bearing bush 9 so that the valve cylinder 10 is slidable. The bearing cylinder 12 is provided at a central portion of the rear shell half member 1b so as to project rearward.

An input rod 20 and a control valve 38 are provided inside the valve cylinder 10. The control valve 38 causes the operation chamber 3 to selectively communicate with one of the vacuum chamber 2 and the atmosphere in accordance with back and force movement of the input rod 20. A brake pedal P is coupled to a rear end of the input rod 20 so as to operate the input rod 20.

The control valve 38 includes a valve piston 18 which is slidably fitted to a guide hole 11 provided in the valve cylinder 10. A reaction piston 17 is formed at a front end of the valve piston 18 via a constricted neck portion 18b. Also, a flange-shaped atmosphere introduction valve seat 31 is formed at a rear end of the valve piston 18. An annular vacuum-pressure introduction valve seat 30 is formed in the valve cylinder 10. The vacuum-pressure introduction valve seat 30 is disposed concentrically with the atmosphere introduction valve seat 30 so as to surround it.

A coupling bore 18a is provided in the valve piston 18 so as to be opened on a rear end face of the atmosphere introduction valve seat 31. A ball joint 20a which is formed at a front end of the input rod 20 is fitted to the coupling bore 18a. A part of the valve piston 18 is caulked so as to prevent the ball joint 20a from falling off the coupling bore 18a. In this way, the input rod 20 is coupled to the valve piston 18 so as to be able to tilt relative to the valve piston 18.

An expandable cylindrical valve element 34 is mounted in the valve cylinder 10 with a valve element holder 33. This valve element 34 has an annular valve portion 34a at a front end thereof. The valve portion 34a operates in cooperation with the vacuum-pressure introduction valve seat 30 and the atmosphere introduction valve seat 31. The valve element 34 is made entirely of an elastic material such as rubber. The valve element 34 includes the annular valve portion 34a, a mounting bead portion 34b, and a flexible portion 34c. The annular valve portion 34a has a front surface that faces the atmosphere introduction valve seat 31 and the vacuum-pressure introduction valve seat 30 so that the front surface of the valve portion 34a can sit on these valve seats 30, 31. The mounting bead portion 34b is supported by the valve cylinder 10 via the valve element holder 33 at a rear of the valve portion 34a. The flexible portion 34c extends rearwards from a rear surface of the valve portion 34a, then extends outwards in a radial direction, and is connected to the mounting bead portion 34b so as to permit the back and forth movement of the valve portion 34a. The mounting bead portion 34b has an annular projecting portion 34b1 on an inner circumferential side thereof.

The valve element holder 33 is formed of a single member made of a sheet of steel. The single member includes a rim portion 33a, an annular arm portion 33b, and a crimp holding portion 33c. The rim portion 33a is fitted to an inner circumferential surface of the valve cylinder 10 via a seal member 35. The arm portion 33b extends inwards in the radial direction from a front end of the rim portion 33a. The crimp holding portion 33c extends from an inner circumferential end of the arm portion 33b to form a bag-like shape and to narrow a front opening portion. The crimp holding portion 33c crimp holds the mounting bead portion 34b from the rear of the mounting bead portion 34b.

A number of slits 46, 46, . . . are formed in an inner circumferential wall 33c1 of the crimp holding portion 33c. The slits 46, 46, . . . are opened on a front end of the inner circumferential wall 33c1. In crimp holding the mounting bead portion 34b, as shown in an upper half portion of FIG. 3, the mounting bead portion 34b is accommodated within the bag-shaped crimp holding portion 33c whose opening portion has not yet been narrowed. Then, as shown in a lower half portion of FIG. 3, the inner circumferential wall 33c1 provided with the number of slits 46, 46, . . . is bent towards the mounting bead portion 34b so that the inner circumferential wall 33c1 is in close contact with an inclined front surface of the annular projecting portion 34b1. As this time, narrowing gaps between the slits 46, 46, . . . enables the inner circumferential wall 33c1 to be smoothly bent inwards in the radial direction. The front opening portion of the crimp holding portion 33c is narrowed in the way described above.

Figure 3:
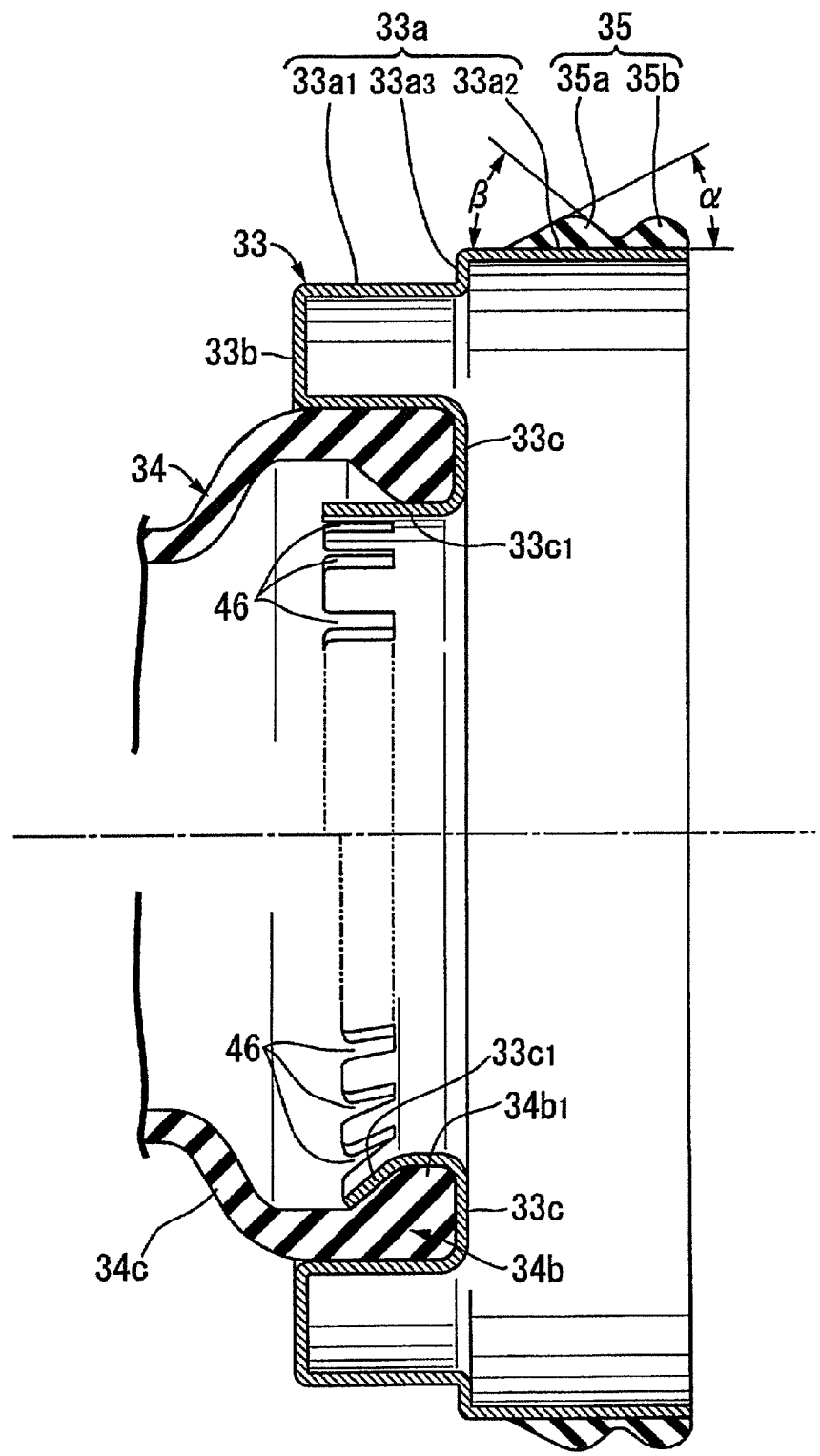
FIG. 3 is a vertical section view of a valve element holder shown in FIG. 2, an upper half portion of FIG. 3 showing a state resulting before the valve element holder is crimped to hold a mounting bead portion of the valve element, a lower half portion of FIG. 3 showing a state in which the valve element holder is crimped to hold the mounting bead portion.

Further, in FIG. 3, the rim portion 33a includes a front cylindrical portion 33a1 and a rear cylindrical portion 33a2. The rear cylindrical portion 33a2 continues to a rear end of the front cylindrical portion 33a1 via an annular step portion 33a3 which is directed forward and is larger in diameter than the front cylindrical portion 33a1. The seal member 35 is bonded to an outer circumferential surface of the rear cylindrical portion 33a2 through vulcanization. The seal member 35 includes two ridge portions 35a, 35b which connect to each other at a valley portion lying therebetween. In the front ridge portion 35a, an angle α of a front slope is set smaller than an angle β of a rear slope.

As shown in FIG. 2, the rim portion 33a having the seal member 35 is press fitted to the inner circumferential surface of the valve cylinder 10 from the rear side and is compression deformed so that the ridge portions 35a, 35b of the seal member 35 are brought into close contact with the inner circumferential surface of the valve cylinder 10.

A rear-facing annular shoulder portion 10b is formed on the inner circumferential surface of the valve cylinder 10. The annular shoulder portion 10b supports the annular step portion 33a3 of the rim portion 33a. Also, an input return spring 41 is provided between the arm portion 33b and the input rod 20 in a compression state. This input return spring 41 biases the arm portion 33b in a direction in which the annular step portion 33a3 is brought into abutment with the annular shoulder portion 10b while biasing the input rod 20 in its retraction direction.

An annular reinforcement plate 44 made of a sheet of steel is embedded in the valve portion 34a. A rear surface of the reinforcement plate 44 is exposed from the valve portion 34a at an inner circumferential end portion thereof. A valve spring 36 is provided between the exposed rear surface of the reinforcement plate 44 and the input rod 20 in a compression state. The valve spring 36 biases the valve portion 34a forward, that is, in a direction in which the valve portion 34a sits on the atmosphere introduction valve seat 31 and the vacuum-pressure introduction valve seat 30.

Thus, the valve piston 18, the vacuum-pressure introduction valve seat 30, the atmosphere introduction valve seat 31, the valve element 34, and the valve spring 36 constitute the control valve 38.

An annular seal lip 37 which is bent to rearward is formed integrally on an outer circumference of the valve portion 34a. The seal lip 37 can be brought into slidable close contact with an inner circumferential surface of an annular rising portion 10a on an inner circumference of the valve cylinder 10. The seal lip 37 defines and forms, on an inner circumferential side of the annular rising portion 10a, a front annular chamber 45a and a rear annular chamber 45b. An outer circumferential surface of the vacuum-pressure introduction valve seat 30 and a front surface of the valve portion 34a face the front annular chamber 45A. The rear surface of the valve portion 34a and a front surface of the flexible portion 34c face the rear annular chamber 45B. When the valve portion 34a sits on the vacuum-pressure introduction valve seat 30, the front annular chamber 45A is closed.

First and second ports 28, 29 are provided in the valve cylinder 10. The first port 28 is formed so that one end thereof is opened on the vacuum chamber 2 and the other end thereof is opened on the front annular chamber 45A. The second port 29 is formed so that one end thereof communicates with the operation chamber 3 and the other end thereof is opened on a portion between the vacuum-pressure introduction valve seat 30 and the atmosphere introduction valve seat 31. Also, a communication hole 47 is provided in the valve tube 10. The communication hole 47 allows the operation chamber 3 to communicate with the rear annular chamber 45B.

An expandable boot 40 covers the valve cylinder 10. Ends of the boot 40 are attached to a rear end portion of the bearing cylinder 12 and the input rod 20, respectively. An atmosphere introduction port 39 is provided in a rear end portion of the boot 40 so as to communicate with an inside of the valve element 34. A filter 42 is interposed between an outer circumferential surface of the input rod 20 and the inner circumferential surface of the valve cylinder 10. The filter 42 filtrates air which flows into the atmosphere introduction port 39. The filter 42 has such flexibility that it does not interrupt relative movements of the input rod 20 and the valve cylinder 10 with respect to each other. Thus, an interior of the valve cylinder 10 which is defined between the filter 42 and the atmosphere introduction valve seat 31 constitutes an atmospheric chamber 43.

A key member 32 is mounted on the valve cylinder 10. The key member 32 is brought into abutment with a front end portion of the bearing cylinder 12 to thereby provide retraction limits of the valve cylinder 10 and the input rod 20.

An operating piston 15 and a small-diameter cylinder bore 16 are provided in the valve cylinder 10. The operating piston 15 projects forward. The small-diameter cylinder bore 16 penetrates a central portion of the operating piston 15. The reaction piston 17 is slidably fitted to the small-diameter cylinder bore 16. A cup member 21 is fitted to an outer circumference of the operating piston 15 so as to be slidable. A flat elastic piston 22 which faces the operating piston 15 and the reaction piston 17 is loaded in the cup member 21. It is noted that a constant gap is provided between the reaction piston 17 and the elastic piston 22 when the vacuum booster B is not in operation.

An output rod 25 is provided so as to continuously connect to a front surface of the cup member 21. Therefore, the output rod 25 is slidably supported by the valve cylinder 10 via the cup member 21. The output rod 25 is connected to a rear end portion of a master piston Mb of the brake master cylinder M. The master piston Mb penetrates a central portion of the front shell half member 1a.

Thus, the operating piston 15, the reaction piston 17, the elastic piston 22, and the cup member 21 constitute a reaction mechanism 24 that feeds back a part of an output of the output rod 25 to the input rod 20.

Referring back to FIG. 1, a coil-shaped booster return spring 27 is provided between a front wall of the booster shell 1 and a front end face of the valve cylinder 10 in a compression state. The booster return spring 27 biases the valve cylinder 10 in the retraction direction. A rear end portion of a wire material that makes up the booster return spring 27 is bent inwards in the radial direction to form a dislocation preventing piece 27a which is brought into abutment with a front end face of the cup member 21. The dislocation preventing piece 27a prevents the cup member 21 from being dislocated from the valve cylinder 10.

Next, an operation of this embodiment will be described.

When the vacuum booster B is at rest, that is, when the input rod 20 is in a released state, the key member 32 which is mounted on the valve cylinder 10 is in abutment with a front end of the bearing cylinder 12, a rear end face of the reaction piston 17 is in abutment with the key member 32, and the input rod 20 is held at the retraction limit by means of a load set on the input return spring 41. At this time, the atmosphere introduction valve seat 31 pushes on the valve portion 34a of the valve element 34 while being in close contact with the valve portion 34a, so that the valve portion 34a is kept slightly apart from the vacuum-pressure introduction valve seat 30. This interrupts the communication between the atmosphere inlet port 39 and the second port 29, while a communication is established between the first and second ports 28, 29. Therefore, a vacuum pressure in the vacuum chamber 2 is transmitted to the operation chamber 3 through the first and second ports 28, 29. Thereby, pressures in the cambers 2, 3 become the same pressure, and therefore, the booster pin 4 and the valve cylinder 10 are held at their retraction positions by means of the biasing force of the booster return spring 27.

When the input rod 20 is in this released state, a vacuum pressure which is transmitted from the vacuum chamber 2 to the rear annular chamber 45B via the first and second ports 28, 29 and the communication hole 47 is exerted on the front surface of the flexible portion 34c of the valve element 34, while the atmospheric pressure which is introduced into the atmospheric chamber 43 is exerted on a rear surface of the flexible portion 34c. Therefore, a forward pressing force resulting from a differential pressure between the vacuum pressure and the atmospheric pressure is applied to the flexible portion 34c. The forward pressing force is transmitted to the atmosphere introduction valve seat 31 via the valve portion 34a and further to the input rod 20 via the valve piston 18. Therefore, the set load of the input return spring 41, which biases the input rod 20 in the retraction direction, is required to be equal to or larger than the forward pressing force.

In this exemplary embodiment, however, the mounting bead portion 34b which continues to the rear end of the flexible portion 34c is crimp held by the crimp holding portion 33c of the valve element holder 33 which continues to the inner end of the arm portion 33b which extends inwards in the radial direction from the rim portion 33a which is fitted to the inner circumference of the valve cylinder 10. Therefore, pressure bearing areas of the flexible portion 34c for the vacuum pressure and the atmospheric pressure are reduced by such an extent that the mounting bead portion 34b deviates inwards in the radial direction from the inner circumferential surface of the valve cylinder 10. Thus, the forward pressing force borne by the flexible portion 34c is reduced. As a result, a load set on the input return spring 41 can be reduced. This means that an operating force with which the input rod 20 is advanced, which will be described later, is reduced. Also, the reduction in operating force with which the input rod 20 is advanced can contribute to improve a brake pedal operation feel in advancing the input rod 20.

Moreover, the valve element holder 33 is formed of the single member which is made of the sheet of steel and which includes the rim portion 33a, the arm portion 33b, and the crimp holding portion 33c. Therefore, an increase in the number of constituent components is suppressed, which contributes to a reduction in production costs.

Also, the seal member 35 which has the double-ridge shape in section and which is configured to be in close contact with the inner circumferential surface of the valve cylinder 10 is bonded to the outer circumferential surface of the rim portion 33a through vulcanization. Thus, the integration of the rim portion 33a and the seal member 35 can not only suppress an increase in the number of constituent components but also reduce the number of man-hours involved in assemblage, which contributes to a further reduction in production costs.

Further, the angle α of the front slope of the seal member 35 having the double-ridge shape in section is set smaller than the angle β of the rear slop thereof. Thereby, the rim portion 33a with the seal member 35 can be smoothly press fitted to the inner circumferential surface of the valve cylinder 10. This can not only improve the assemblage of the valve element holder 35 into the valve cylinder 10 but also prevent the separation of the seal member 35 from the rim portion 33a which would otherwise be caused by insertion resistance generated then.

Furthermore, the seal member 35 includes plural rows of ridge portions 35a, 35b which continuously connect to each other at the trough portion therebetween. Therefore, the seal member 35 is brought into contact with the inner circumferential surface of the valve cylinder 10 at the plural seal portions, which enhances the sealing effect by the seal member 35. Also, a vulcanized bonding surface between the seal member 35 and the rim portion 33a, is increased, which can effectively enhance the bonding strength thereof.

In addition, the mounting bead portion 34b of the valve element 34 has the annular projecting portion 34b1 on the inner circumferential side thereof. The inner circumferential wall 33c1 of the crimp holding portion 33c of the valve element holder 33 has the number of slits 46, 46, . . . which are opened on the front end thereof. The inner circumferential wall 33c1 is bent so as to be in close contact with the inclined front surface of the annular projecting portion 34b1. Thus, it is facilitated to bend the inner circumferential wall 33c1 of the crimp holding portion 33c. Thereby, it is easy to crimp hold the mounting bead portion 34b by the crimp holding portion 33c in an ensured fashion.

Further, the rim portion 33a of the valve holder 33 is formed into the step-like shape which has the annular step portion 33a3, which is directed forward, in the intermediate portion of the rim portion 33a. The annular shoulder portion 10b which supports the annular step portion 33a3 is formed at the rear end of the annular rising portion 10a of the valve cylinder 10. Also, the input return spring 41 is provided between the arm portion 33b of the valve element holder 33 and the input rod 20 in the compression state. Thus, the input return spring 41 not only biases the input rod 20 in the retraction direction but also holds the valve element holder 33 in a predetermined position where the annular step portion 33a3 thereof is supported by the annular shoulder portion 10b. In addition, the arm portion 33b of the valve holder 33 serves as a spring seat member which supports a front end of the input return spring 41. Thus, it is not necessary to provide a dedicated spring seat member, to thereby make it possible to realize the simplified configuration.

When the input rod 20 is advanced together with the valve piston 18 against the set load of the input return spring 41 by depressing the brake pedal P in order to apply the brakes of the vehicle, the biasing force of the valve spring 36 causes the valve portion 34a to sit on the vacuum-pressure introduction valve seat 30. At the same time, the atmosphere introduction valve seat 31 moves away from the valve element 34. Thereby, the communication between the first and second ports 28, 29 is interrupted, and the second port 29 communicates with an interior of the valve element 34, that is, with the atmospheric chamber 43.

As a result, the atmosphere which flows from the atmosphere introduction port 39 into the atmospheric chamber 43 passes through the atmosphere introduction valve seat 31 to be introduced into the operation chamber 3 by way of the second port 29, which causes the operation chamber 3 to have a higher pressure in than in the vacuum chamber 2. Forward thrust results from a differential pressure between the pressures in the chambers 2, 3, whereby the booster pin 4 advances together with the valve cylinder 10, the operating piston 15, the elastic piston 22, the cup member 21, and the output rod 25 against the biasing force of the booster return spring 27, which causes the output rod 25 to drive the master piston Mb to move forward. Then, the elastic piston 22 is compressed by the reaction force generated in association with the driving of the master piston Mb, and a part of the elastic piston 22 is caused to swell into the small-diameter cylinder bore 16. However, the reaction force is not transmitted to the input rod 20 until the swelling portion is brought into abutment with a front surface of the reaction piston 17. Therefore, the output of the output rod 25 exhibits a jumping characteristic in which the output rises quickly.

With the input rod 20 is operated to advance in the way described above, the vacuum pressure which is transmitted from the first port 28 to the front annular chamber 45A of the valve cylinder 10 is exerted on the front surface of the valve portion 34a which faces the front annular chamber 45A, while the atmospheric pressure which is transmitted from the second port 29 to the rear annular chamber 45B via the communication hole 47 is exerted on the rear surface of the valve portion 34a which faces the rear annular chamber 45B. Thus, the valve portion 34a is biased in the direction in which the valve portion 34a is seated on the vacuum-pressure introduction valve seat 30 not only by the load set on the valve spring 36 but also by the differential pressure between the front and rear annular chambers 45A, 45B. Consequently, the load set on the valve spring 36 can be reduced by an extent corresponding to the biasing force exerted by the differential pressure, as a result of which the load set on the input return spring 41 which biases the input rod 20 in the retraction direction can be reduced in turn. Thus, since the jumping characteristic can be achieved by a relatively small initial operation force, ineffective strokes of the master cylinder M and individual wheel brakes can be eliminated quickly, which makes it possible to enhance the response of the individual wheel brakes.

In addition, in this state, the seal lip 37 on the outer circumference of the valve portion 34a is bent rearward to be in close contact with the inner circumferential surface of the valve cylinder 10. Therefore, the force with which the seal lip 37 is brought into close contact with the inner circumferential surface of the valve cylinder 10 is enhanced by the differential pressure between the front and rear annular chambers 45A, 45B, thereby making it possible to ensure the airtightness between both the annular chambers 45A, 45B.

After the elastic piston 22 is brought into abutment with the reaction piston 17, a part of the reaction force resulting from the operation of the output rod 25 is fed back to the input rod 20 by way of the elastic piston 22. Therefore, an operator can feel the magnitude of the output of the output rod 25. Then, the output of the output rod 25 increases based on a boosting ratio which is determined by a ratio of pressure bearing areas of the operating piston 15 and the reaction piston 17 which are in abutment with the elastic piston 22.

After a boosting limit point is reached where the differential pressure between the vacuum chamber 2 and the operation chamber 3 becomes maximum, the output of the output rod 25 becomes a sum of (i) the maximum thrust of the booster piston 4 which results from the differential pressure and (ii) the operation input to the input rod 20.

When the depressing effort is removed from the brake pedal P in an attempt to release the brakes applied, firstly, the input rod 20 and the valve piston 18 are retracted by means of the force of the input return spring 41. In association with this, the valve piston 18 causes the valve element 34 to be separated largely from the vacuum-pressure introduction valve seat 30 while keeping the valve element 34 seated on the atmosphere introduction valve seat 31, whereby the operation chamber 3 is allowed to communicate with the vacuum chamber 2 via the second port 29 and the first port 28. As a result, the introduction of the atmosphere into the operation chamber 3 is prevented, while the air in the operation chamber 3 is suctioned by the vacuum source V by way of the vacuum chamber 2, whereby the difference in pressure between both the chambers 2, 3 is eliminated. As a result, the booster piston 4 is retracted by the spring-back force of the booster return spring 27, whereby the operation of the master cylinder M is released. Then, the key member 32 which is mounted on the valve cylinder 10 is brought into abutment with the front end of the bearing cylinder 12 at both end portions thereof as described above. Thereby, the booster piston 4 and the input rod 20 are returned to their rest states.

The invention is not limited to the embodiments described above. The invention may be modified in design variously so long as modifications do not depart from its gist and spirit. For example, the seal lip 37 on the outer circumference of the valve portion 34a may be omitted, and a direct communication may be established between the front and rear annular chambers 45A, 45B. In this case, the rear annular chamber 45B is in communication with the vacuum chamber 2 by way of the first port 28 at all times even without the communication hole 47, and the vacuum pressure in the vacuum chamber 2 is exerted on the front surface of the flexible portion 34c of the valve element 34 at all times.

What is claimed is:

1. A vacuum booster comprising:
   a booster shell;
   a booster piston that is accommodated in the booster shell to define an interior of the booster shell into a front vacuum chamber and a rear operation chamber, wherein the front vacuum chamber is configured to be communicated with a vacuum source;
   a valve cylinder connected to the booster piston;
   an input rod provided in the valve cylinder;
   a control valve provided in the valve cylinder, the control valve selectively causing the operation chamber to communicate with one of the vacuum chamber and atmosphere in accordance with back and forth movement of the input rod; and
   an input return spring that is provided between the valve cylinder and the input rod in a compression state and that biases the input rod in a retraction direction, wherein
   the control valve comprises
      a valve piston connected to a front end portion of the input rod and fitted to the valve cylinder so as to be slidable on the valve cylinder,
      an annular atmosphere introduction valve seat that is provided on a rear end portion of the valve piston and that faces an atmospheric chamber in the valve cylinder,
      an annular vacuum-pressure introduction valve seat provided in the valve cylinder so as to surround the atmosphere introduction valve seat,
      a valve element including
         an annular valve portion having a front surface that faces the vacuum-pressure introduction valve seat and the atmosphere introduction valve seat so that the front surface of the valve portion is able to sit thereon,
         a mounting bead portion supported by the valve cylinder via a valve element holder at a rear of the valve portion, and
         a flexible portion that extends from a rear surface of the valve portion and that is connected to the mounting bead portion so as to permit the back and forth movement of the valve portion, at least a part of the flexible portion extending outwards in a radial direction of the valve cylinder, and
      a valve spring that is provided between the valve portion and the input rod in a compression state so as to bias the valve portion forward,
   a first port and a second port are provided in the valve cylinder,
   the first port establishes a communication between an outer circumferential portion of the vacuum-pressure instruction valve seat and the vacuum chamber,
   the second port establishes a communication between (i) the operation chamber and (ii) a part between the vacuum-pressure introduction valve seat and the atmosphere introduction valve seat,
   at least when the input rod is released, a front surface of the flexible portion communicates with the first port,
   the valve element holder formed of a single member made of a sheet of steel, the single member comprising
      a rim portion that is fitted to an inner circumferential surface of the valve cylinder via a seal member,
      an annular arm portion that extends inwards in the radial direction from a front end of the rim portion, and
      a crimp holding portion that extends from an inner circumferential end of the arm portion to form a bag-like configuration and to narrow a front opening portion and that crimp-holds the mounting bead portion from the rear thereof.

2. The vacuum booster according to claim 1, wherein the seal member is formed to have a ridge shape in section and is bonded to an outer circumferential surface of the rim portion through vulcanization.

3. The vacuum booster according to claim 2, wherein an angle of a front slope of the seal member having the ridge shape in section is smaller than an angle of a rear slope thereof.

4. The vacuum booster according to claim 2, wherein the seal member comprises a plurality of rows of ridge portions that are connected to each other at a trough portion.

5. The vacuum booster according to claim 3, wherein the seal member comprises a plurality of rows of ridge portions that are connected to each other at a trough portion.

6. The vacuum booster according to claim 1, wherein
   the mounting bead comprises an annular projecting portion on an inner circumferential side thereof,
   a number of slits are formed in an inner circumferential wall of the crimp holding portion, the slits being opened on a front end of the inner circumferential wall, and
   the inner circumferential wall is bent so as to be brought into close contact with a front surface of the annular projecting portion.

7. The vacuum booster according to claim 2, wherein
the mounting bead comprises an annular projecting portion on an inner circumferential side thereof,
a number of slits are formed in an inner circumferential wall of the crimp holding portion, the slits being opened on a front end of the inner circumferential wall, and
the inner circumferential wall is bent so as to be brought into close contact with a front surface of the annular projecting portion.

8. The vacuum booster according to claim 3, wherein
the mounting bead comprises an annular projecting portion on an inner circumferential side thereof,
a number of slits are formed in an inner circumferential wall of the crimp holding portion, the slits being opened on a front end of the inner circumferential wall, and
the inner circumferential wall is bent so as to be brought into close contact with a front surface of the annular projecting portion.

9. The vacuum booster according to claim 4, wherein
the mounting bead comprises an annular projecting portion on an inner circumferential side thereof,
a number of slits are formed in an inner circumferential wall of the crimp holding portion, the slits being opened on a front end of the inner circumferential wall, and
the inner circumferential wall is bent so as to be brought into close contact with a front surface of the annular projecting portion.

10. The vacuum booster according to claim 5, wherein
the mounting bead comprises an annular projecting portion on an inner circumferential side thereof,
a number of slits are formed in an inner circumferential wall of the crimp holding portion, the slits being opened on a front end of the inner circumferential wall, and
the inner circumferential wall is bent so as to be brought into close contact with a front surface of the annular projecting portion.

11. The vacuum booster according to claim 1, wherein
the rim portion is formed into a step-like shape that comprises an annular step portion in an intermediate portion of the rim portion, the annular step portion being directed forward,
the valve cylinder comprises an annular shoulder portion that supports the annular step portion, and
the input return spring is provided between the arm portion and the input rod in the compression state.

12. The vacuum booster according to claim 1, wherein the valve element is an expandable cylindrical valve element mounted in the valve cylinder with the valve element holder.

13. The vacuum booster according to claim 12, wherein the valve element is made entirely of an elastic material.

14. The vacuum booster according to claim 13, wherein the mounting bead portion is separated from the valve cylinder by the annular arm portion of the valve element holder.

15. The vacuum booster according to claim 14, wherein the annular arm portion is positioned between the rim portion and the crimp holding portion.

16. The vacuum booster according to claim 14, wherein an end of the input return spring rests on the annular arm portion.

17. The vacuum booster according to claim 16, wherein the end of the input return spring is positioned between the rim portion and the crimp holding portion.

18. The vacuum booster according to claim 17, wherein the end of the input return spring is positioned between the rim portion and the mounting bead portion.

19. The vacuum booster according to claim 17, wherein a portion of the valve element, remote from the valve holder element, contacts an annular rising portion of the valve cylinder.

20. The vacuum booster according to claim 19, wherein the valve element holder contacts the annular rising portion of the valve cylinder and is also separated from a non-annular rising portion of the valve cylinder by the seal member which is positioned between the valve cylinder and the valve element holder.

* * * * *